United States Patent
Bestgen et al.

(10) Patent No.: US 7,007,009 B2
(45) Date of Patent: Feb. 28, 2006

(54) REPRESENTATION FOR DATA USED IN QUERY OPTIMIZATION

(75) Inventors: Robert Joseph Bestgen, Dodge Center, MN (US); Curtis Neal Boger, Oronoco, MN (US); John David Dietel, Rochester, MN (US); Randy L. Egan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 09/810,973

(22) Filed: Mar. 15, 2001

(65) Prior Publication Data

US 2003/0018618 A1    Jan. 23, 2003

(51) Int. Cl.
*G60F 17/30*    (2006.01)
(52) U.S. Cl. .............................. 707/3; 707/4; 707/102
(58) Field of Classification Search .................... 707/2, 707/3, 4, 5, 100, 102
See application file for complete search history.

(56) References Cited

U.S. PATENT DOCUMENTS

| | | | | |
|---|---|---|---|---|
| 5,301,317 A | * | 4/1994 | Lohman et al. ................. | 707/2 |
| 5,619,692 A | | 4/1997 | Malkemus et al. ........... | 395/602 |
| 5,852,821 A | | 12/1998 | Chen et al. ..................... | 707/2 |
| 5,913,205 A | | 6/1999 | Jain et al. ....................... | 707/2 |
| 5,960,428 A | | 9/1999 | Lindsay et al. ................. | 707/4 |
| 6,032,143 A | | 2/2000 | Leung et al. ................... | 707/2 |
| 6,108,648 A | * | 8/2000 | Lakshmi et al. ............... | 707/2 |
| 6,212,514 B1 | * | 4/2001 | Eberhard et al. ............... | 707/2 |
| 6,226,629 B1 | * | 5/2001 | Cossock ......................... | 707/3 |
| 6,330,552 B1 | * | 12/2001 | Farrar et al. ................. | 705/400 |
| 6,477,534 B1 | * | 11/2002 | Acharya et al. ............. | 707/100 |
| 6,529,901 B1 | * | 3/2003 | Chaudhuri et al. ............. | 707/3 |
| 6,532,470 B1 | * | 3/2003 | Cochrane et al. ........... | 707/102 |
| 6,581,055 B1 | * | 6/2003 | Ziauddin et al. ............... | 707/4 |
| 2002/0124001 A1 | * | 9/2002 | Chaudhuri et al. ......... | 707/100 |
| 2004/0181521 A1 | * | 9/2004 | Simmen ......................... | 707/3 |

* cited by examiner

*Primary Examiner*—Charles Rones
(74) *Attorney, Agent, or Firm*—Moser, Patterson & Sheridan, LLP (57) ABSTRACT

Optimizers must work with numeric data from a variety of sources including column statistics, estimated filter factors, record counts estimated costs and the like. Embodiments provided herein define and represent any such numeric measurements as a Vector of N dimensions, where n is a number of aspects of measurements that a particular optimizer is configured to consider. A particular embodiment provides a 4-dimensional vector where the dimensions represent magnitude, confidence, variance interval, and penalty. Examples of measurements considered by the optimizer, and which may be represented as a vector, include cost, estimated selectivity of a predicate, estimated number of records returned from part or all of a query, estimated record fanout when joining one file to another, etc.

16 Claims, 3 Drawing Sheets

REPRESENTATION FOR DATA USED IN QUERY OPTIMIZATION

BACKGROUND OF THE INVENTION

1. Field of the Invention

Embodiments of the present invention relate to databases. More specifically embodiments relate to query optimization.

2. Background of the Related Art

Databases are computerized information storage and retrieval systems. A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns (formally denominated "attributes"). Reference is made to C. J. Date, *An Introduction to Database Systems,* 6th edition, Addison-Wesley Publishing Co. Reading, Mass. (1994) for an comprehensive general treatment of the relational database art.

An RDBMS is structured to accept commands to store, retrieve and delete data using, for example, high-level query languages such as the Structured Query Language (SQL). The term "query" denominates a set of commands for retrieving data from a stored database. These queries may come from users, application programs, or remote systems (clients or peers). The query language requires the return of a particular data set in response to a particular query but the method of query execution ("Query Execution Plan") employed by the RDBMS is not specified by the query. The method of query execution is typically called an execution plan, an access plan, or just "plan". There are typically many different useful execution plans for any particular query, each of which returns the required data set. For large databases, the execution plan selected by the RDBMS to execute a query must provide the required data return at a reasonable cost in time and hardware resources. In general, the overall optimization process includes four broad stages. These are (1) casting the user query into some internal representation, (2) converting to canonical form, (3) choosing prospective implementation procedures, and (4) generating executable plans and choosing the cheapest of said plans.

Generally, the RDBMS includes a query optimizer component configured to select the manner in which queries will be processed. The query optimizer is a key software component of any RDBMS. The primary task of the optimizer is to determine the cheapest (i.e., most efficient) way to execute each particular query request against a database. To this end, the optimizer chooses one plan from a group of plans. The plan contains (in a proprietary form unique to the RDBMS) low-level information indicating precisely what steps the system is to take to execute the query.

For any given query, there are any number of possible "plans" that could be chosen. Thus, the optimizer must select the best one for each query it encounters. In doing so, the optimizer must compare the costs (estimated resource requirements usually in terms of time and space) of competing plans in order to pick the "best" one.

An optimizer's job is necessary and difficult because of the enormous (virtually infinite) number of possible query forms allowed/supported/defined by SQL combined with a virtually infinite number of methods of accessing the actual data records from each table referenced (e.g. using an index, a hash table, etc.). In addition, since the optimizer is free to rewrite a query (or a portion of it) into any equivalent form, and for any given query there are usually many equivalent forms, the optimizer has an extremely large (if not virtually infinite) universe of possible solutions (plans) to consider, and limited time in which to do it.

One problem with conventional optimizers is that the decision for a particular plan is made with information that is partial or estimated. Since interesting queries are generally long, complex, and involve many relational tables, plan alternatives are generated for portions of a query, their estimated costs computed, and then incrementally combined to arrive at a complete plan. An optimizer compares estimates (usually expressed in terms of time and space requirements) of the runtime costs of competing plans or portions thereof, choosing the "best" one at each step. Nearly all numeric data being used by the optimizer comes from information about the data in the files (tables) referenced in the query, and is estimated, since the only way to know such data with 100% certainty is to actually run the query. This is impractical, because there are countless possible plans to try.

Furthermore, based on the query algebra supported by SQL it can be shown that the number of different plan possibilities is virtually infinite. To be effective, however, it is necessary for the optimizer to select a plan within a reasonable, finite time. Given the practical time and resource constraints, an optimizer cannot consider the entire solution space, so some a mechanism is required to eliminate entire quadrants of the solution space as quickly as possible, or to point the process in a certain direction in the solution space. At the same time, the mechanism cannot inadvertently ignore that portion of the solution space that contains the best access plan. Unfortunately, the risk of missing the best plan or choosing an exceptionally bad plan is often high, but usually unmeasured. Choosing a bad plan can be catastrophic; it is not unusual for a JOIN query involving files with large numbers of records to run for hours or even days (or at least until the user aborts the query).

Some conventional optimizers try a subset of the possible solutions (the ones they "know" how to execute) and select what is believed to be the cheapest plan. Other optimizers have a time limit for optimization, and when it is reached the lowest cost plan developed so far is selected. Neither of these mechanisms account for the quality or reliability of the solution in deciding when to stop optimizing; rather, only the lowest absolute cost estimate is considered. Still other optimizers use qualitative rules to avoid large areas of the search space they have determined may be unfruitful.

Traditionally, decisions to consider different areas of the solution space, cost comparisons, and all intermediate calculations leading up to these are made by simple numeric comparisons and mathematical operations on scalar values (numbers). These comparisons and operations are usually tempered by specific hard-coded condition checks that have been added due to a particular query found by a user that caused a catastrophic plan to be generated when using simply the comparison of numeric values. Such numeric data (estimates) do not include a measure of their possible variance, their origin, or any other aspect of the value, so there is no way to measure for example, the risk of being wrong, the degree to which the values may be wrong, nor the impact that such error might have on the final outcome.

In some cases, combinatorial operations (mathematics) are applied to such numbers which cause the results to have a level of error that is often greater than that of the original values (the cumulative error effect). In addition, a cost estimate that originates directly from real statistics on a column in a file is treated with exactly the same respect as one that was the result of combining several estimates mathematically. In the extreme case, the optimizer has no information about the data, so a default estimate is used. Naturally, calculations based on these are extremely suspect.

As a result, the final cost estimate for an execution plan often has a significant but unmeasured and unstated margin for error. Such estimates and other numeric data have other aspects as well which are currently unrepresented, and therefore their effects are neither propagated nor accumulated. Moreover, the optimizer cannot differentiate between such a calculated value that has no error and one that does. Ultimately, the optimizer chooses a plan from amongst the competing possibilities, sometimes with extremely faulty information. As a result, when plans are chosen using conventional techniques, the resulting query may run for days, or perhaps never finish before the user terminates the optimization process.

Therefore, there is a need for a query optimizer adapted to overcome the shortcomings of the prior art and improves the effectiveness and efficiency of selecting an execution plan.

SUMMARY OF THE INVENTION

In one embodiment, a method of optimizing and processing a query in a database management system in order to retrieve data from computer storage is provided. The method comprises receiving a query, preparing a first execution plan for the query, and calculating a cost for the first execution plan, wherein the cost is represented as a first vector quantity comprising at least two dimensions. A determination is then made as to whether the first execution plan should be selected for execution based on the first vector quantity.

In another embodiment, a method of optimizing and processing a query in a database management system in order to retrieve data from computer storage is provided. The method comprises receiving a query, calculating a first vector quantity of X dimensions, wherein X is an integer greater than 1 and calculating a second vector quantity of Y dimensions, wherein Y is an integer greater than 1. The first and second vector quantities are to be used in calculating a cost for a first execution plan.

In yet another embodiment, a method of optimizing and processing a query in a database management system in order to retrieve data from computer storage is provided. The method comprises receiving a query, preparing a first execution plan for the query, calculating a cost for the first execution plan, wherein the cost is represented as a first vector quantity comprising at least two dimensions. At least one dimension is selected from a magnitude, a variance range, a confidence and a penalty. In a particular embodiment, the magnitude is a value having the highest probability to be within the variance range, the variance range is a range in which the confidence applies, the confidence is a probability that a real value is within the variance range, and the penalty is a maximum delta from the magnitude. The method further comprises determining whether the first execution plan should be selected for execution based on the first vector quantity.

Still another embodiment provides a signal bearing medium containing a program which, when executed by a processor, performs a method of optimizing and processing a query in a database management system in order to retrieve data from computer storage. The method comprises receiving a query, preparing a first execution plan for the query, and calculating a cost for the first execution plan, wherein the cost is represented as a first vector quantity comprising at least two dimensions. A determination is then made as to whether the first execution plan should be selected for execution based on the first vector quantity.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The System

Methods, systems and articles of manufacture are provided for query optimization. While the embodiments hereinafter will be described in the context of fully functioning computers and computer systems, those skilled in the art will appreciate that the various embodiments of the invention are capable of being distributed as a program product in a variety of forms, and that embodiments of the invention apply equally regardless of the particular type of signal bearing media used to actually carry out the distribution. In one embodiment, a signal bearing medium contains a program which, when executed by a processor, performs an optimization method. Examples of signal bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and includes wireless communications. The latter embodiment specifically includes information downloaded from the Internet and other networks. Such signal-bearing media, when carrying computer-readable instructions that direct the functions of the present invention, represent embodiments of the present invention.

Figure 1:
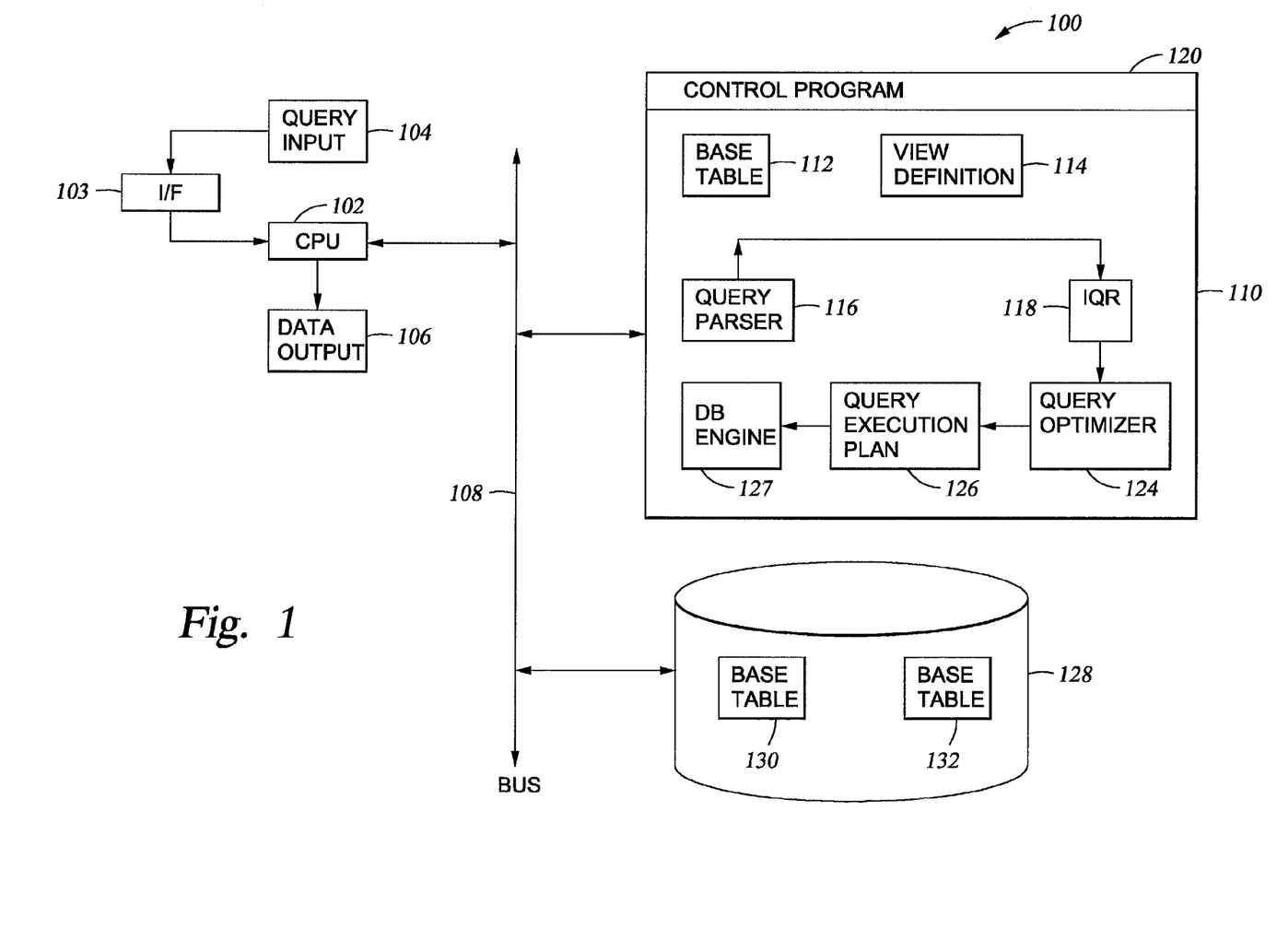
FIG. 1 shows a high level diagram of a database management system.

FIG. 1 shows a functional block diagram of a computer-implemented database processing system 100 suitable for practicing the procedure of this invention. This exemplary configuration is described for illustrative purposes only and it should be appreciated that other embodiments are possible. System 100 includes a central processing unit (CPU) 102, which is coupled to a parallel bus 108. The query input terminal 104 allows the user to enter queries into system 100, either from a remote terminal or through any other useful method known in the art.

In one embodiment, query input terminal 104 may communicate with the CPU 102 via a standard operator terminal interface 103, such as one of the interfaces known as IMS/DB/DC, CICS, TSO, OS/2. More generally, the interface 103 may be any entry/exit component configured to transmit electrical signals to and from the CPU and that represent commands for performing various search and retrieval functions against a database 128.

In one embodiment, the input queries conform to the SQL standard interface, and invoke functions performed by RDBMS software. Illustratively, the RDBMS software comprises the "DB2" product offered by the IBM Corporation for the "MVS", "AIX", or "OS/2" operating systems. Such software generally resides in computer memory. Those skilled in the art will recognize that the present invention has application to any RDBMS software that uses SQL, and may similarly be applied to non-SQL queries.

As used herein, a "query" includes a combination of SQL, commands intended to produce one or more output data tables according to specification included in the query. The data output terminal 106 displays the query results to the user and may be physically co-located with query input terminal 104.

System 100 includes the address space 110, which is shown schematically as containing program objects and data objects. The base table 112 is an example of a data object pulled into address space 110 from the database 128 by way of bus 108. The view definition 114 is another data object representing a "virtual table" made up of elements from one or more base tables in accordance with a VIEW definition statement. Database 128 includes a generally large plurality of base tables, exemplified by base tables 130 and 132. These base tables are moved partially or entirely between memory space 110 and database 128 in a manner well-known in the art for database management systems.

Address space 110 also includes the control program object 120, which manages the other components of system 100. These components include a query parser 116 for accepting the query input from terminal 104 and forwarding it to an Internal Query Representation (IQR) optimizer 118. IQR optimizer 118 rewrites the parsed IQR representation of the user query to provide a "canonical form" of the IQR representation for output to the query optimizer 124. For instance, a IQR canonical form may include a large cyclical join graph having data-flow arcs from many base tables.

After query optimizer 124 receives the canonical "database-integral" (DI) IQR from IQR optimizer 118, a generally large number of useful plans for executing the DI-IQR are generated and tested for "cost" in accordance with a predetermined cost formula. After identifying an "optimal" query execution plan, optimizer 124 produces this plan as a program object, depicted as query execution plan 126 in address space 110. Plan 126 is finally executed with the database engine 127 and the resulting table is forwarded to data output of display 106 upon completion.

As noted above, the query processor component (the parser 116 and the IQR) of the RDBMS will respond to submission of a user query by providing the optimizer 124 with rewritten code that permits selecting from multiple execution plans. After the optimizer 124 receives the rewritten code, optimizer selection techniques can be applied to select the most efficient plan. That is, the optimizer 124 is provided with system information such as the location of tables and parts of tables, the size of such tables, network node locations, system operating characteristics and statistics, and the like.

Generally, the SQL statements received as input from the user specify the data the user wants, in the form of a query, but do not specify how to get it. The access plan represents the computer-generated sequence of operations to obtain the data specified by the user query. Generation of the access plan involves consideration of both the available access paths (indexes, sequential reads, etc.) and system held statistics on the data to be accessed (the size of the table, the number of distinct values in a particular column, etc.), to choose what the RDBMS processor considers to be the most efficient access plan for the query. The selection of the most efficient access plan utilizes query, database, and system information that is available to the optimizer 124.

Figure 2:
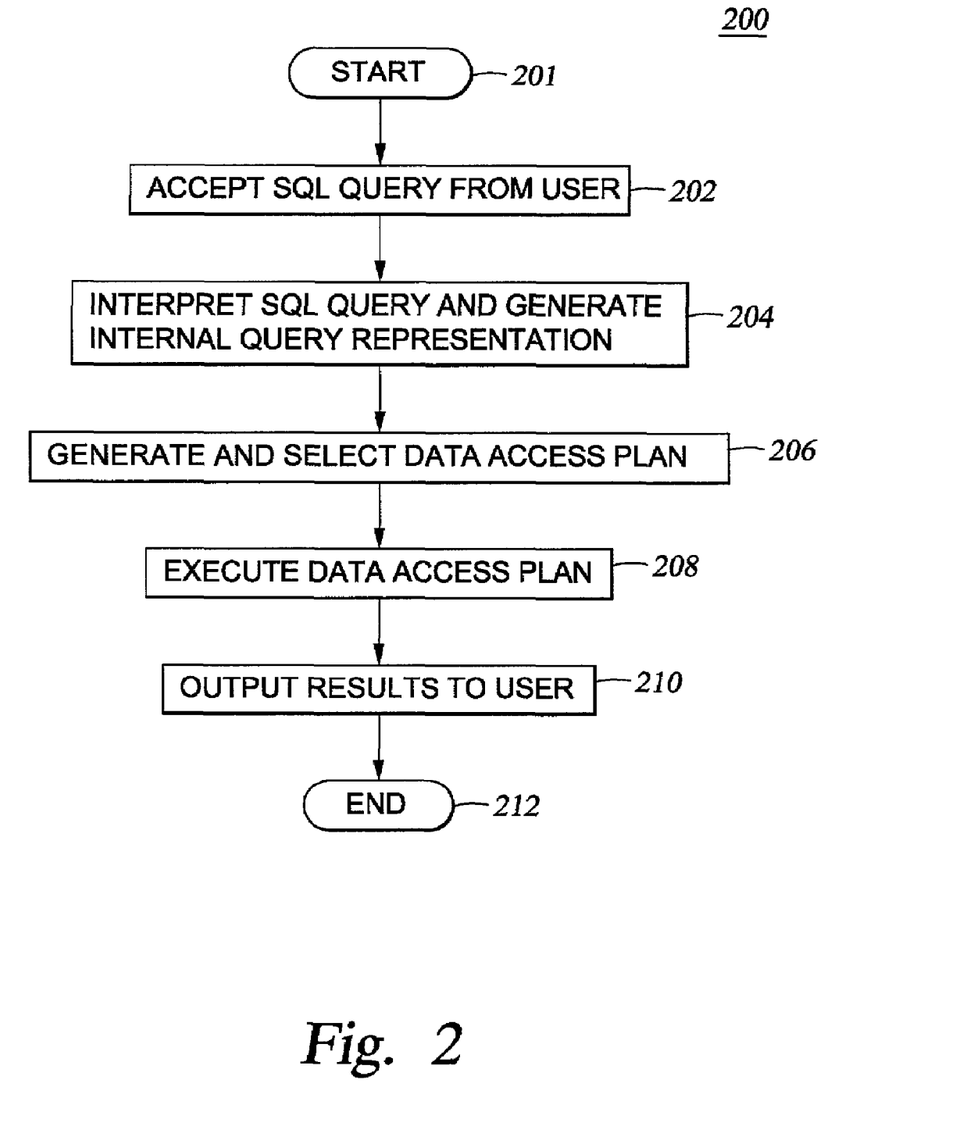
FIG. 2 shows a flow chart illustrating plan generation and execution.

FIG. 2 shows a method 200 of optimizing and executing a query. Illustratively, these steps are implemented as computer program steps stored in the system 100. The method 200 is entered at step 201 and proceeds to 202. Step 202 represents the input of an SQL statement into the computer system 100 from the user. At step 204 the received SQL statement is compiled or interpreted. Step 206 represents generating a compiled set of runtime structures, called an "access plan", from the compiled SQL statements. The execution cost of the plans are compared until either no alternatives remain or a time limit expires. Selection of a plan at step 206 is preferably performed by the optimizer 124 when configured with a vector in a manner described below. The selected plan is then executed at step 208 and the results of the execution are output to the user at step 210. The method 200 is exited at step 212.

Introduction to Numeric Optimizer Datum

Optimizers must work with numeric data from a variety of sources including: column statistics, estimated filter factors, record counts estimated costs and the like. Conventionally, such numeric values are represented as simple scalars. In contrast, embodiments provided herein define and represent any such numeric measurements as a Vector of N dimensions, where N is a number of aspects of measurements that a particular optimizer is configured to consider. Such a vector is referred to herein as a "Numeric Optimizer Datum," or NOD.

Examples of measurements considered by the optimizer, and which may be represented as a NOD, include: cost, estimated selectivity of a predicate, estimated number of records returned from part or all of a query, estimated record fanout when joining one file to another. Advantageously, a NOD can be used to simultaneously represent all interesting aspects of such a measurement. For example, for any measurement, a NOD may represent whether the measurement is an estimate, a calculated value, an intermediate result, or absolute fact.

A particular embodiment provides a 4-dimensional NOD where the dimensions represent: magnitude, confidence, variance interval, and penalty.

Magnitude is the raw numeric value of the item, and is defined as the "most likely" value within the Variance Interval. Magnitude is specified as a floating point number and its units are defined by the context of its usage. That is, the units are determined by a programmer using a NOD for a particular purpose. In one embodiment, such NOD may represent the number of records returned, in another, the time it takes to run a portion of the query.

The variance interval defines an upper and lower absolute limit within which the actual value falls. As with magnitude, the variance interval is determined in context. In each case, a narrower range results in a more predictable result.

Confidence represents the probability that the magnitude represents the actual value of the NOD. In the case of a cost, for example, this may represent a value that was derived from an estimate (low probability), was arrived at via feedback from an actual run of the query (high probability), or some other source where a degree of uncertainty is involved. The confidence puts a measurement on the inherent uncertainty, and the optimizer can make use of this information during plan generation. Confidence is specified as a double float value between 0.0 and 1.0 (a simple probability). A larger confidence suggests a greater likelihood that the magnitude represents the actual value of the NOD, and therefore is preferred to a smaller confidence value.

Illustratively, confidence is determined according to how the associated magnitude received its value, and is based on usage. For example, if statistical data is available over the columns of a file, the data can be used to determine the selectivity of a predicate with a confidence level that is based on the statistical technique used. In other cases, a programmer may know or calculate the value based on circumstances.

In some embodiments, the confidence attached to a particular NOD is modified as the optimizer works its way through the search space. For example, a strategy may involve trying to increase the confidence by requesting better statistics on selected items. Penalty expresses what the impact would be, should the NOD's value be wrong in the worst case. By "wrong" is meant that for a particular execution of the query what was experienced in terms of execution time, selectivity, or join fanout, for example, did not match the estimates used during optimization.

Penalty may be calculated on a case by case basis by a creator of a NOD instance, and is based on context. For example, in a JOIN query, an incorrect estimate for fanout would be catastrophic. For a NON-JOIN query, an incorrect estimate for selectivity may not result in significantly detrimental results.

Plan Superiority

One type of decision that the optimizer is faced with is to determine which of two or more plans or portions of plans are superior. This situation often arises in the case of a query having predicates, wherein the predicates are evaluated when the query is executed to determine which records (tuples) to return. A predicate is an SQL expression that can assume a logical value of TRUE, FALSE, or UNKNOWN. An SQL query usually includes at least one predicate. Typically, a predicate specifies a data range, tests for an existence condition, tests for equivalence, or performs a similar table comparison operation. Selectivity implies a reference to a percentage of total records from the files that would be returned by applying predicates.

Consider the following query involving the selectivity of two predicates (the comparisons in the WHERE clause)

QUERY 1

0001 SELECT T1.Col1
0002 FROM T1, T2
0003 WHERE T1.Col1 = T2.Col1 AND T1.Col2 = 'A' AND T2.Col2 = 'B'

Query 1 will return a value from Col1 in T1 for every pair of records in T1 and T2 where Col1 values match, and the value of T1. Col2 is 'A', and the value of T2. Col2 is 'B'. Of particular significance is the join fanout. For example, if the tables T1 and T2 contain the following data:

TABLE I

| | T1 | | | T2 | |
| --- | --- | --- | --- | --- | --- |
| | COL1 | COL2 | | COL1 | COL2 |
| 1 | 'D' | 'A' | 1 | 'A' | 'B' |
| 2 | 'C' | 'A' | 2 | 'C' | 'B' |
| 3 | 'A' | 'A' | 3 | 'A' | 'B' |
| | | | 4 | 'A' | 'B' |
| | | | 5 | 'D' | 'B' |
| | | | 6 | 'D' | 'B' |

The result set for this "Join Query" will contain a record for each of the following pairs (in the form (T1 record #, T2 record #)): (1,5) (1,6) (2,2) (3,1) (3,3) (3,4). Thus, "Fanout" refers to how many matches there are in table T2 for each record in the table T1.

In general, if a particular record is not going to be returned by the query, it is desirable to eliminate the record as soon as possible in order to decrease the runtime of the query. The improved runtime is achieved because all other operations and comparisons involving the data from the eliminated record don't have to be performed.

In the present example (Query 1), the optimizer may position the most selective predicate first so as to eliminate records as soon as possible in the execution of the query. Ordering the predicates is possible because the predicates are ANDed. Thus, the optimizer is free to change their order of application, as such a change would not affect the results of the query.

Assume that for Query 1 the optimizer used statistics about the database tables to determine the selectivity values shown in Table II.

TABLE II

Selectivity(T1.Col1 = 'A') is 5%
Selectivity(T2.Col1 = 'B') is 10%

A conventional optimizer considers only the magnitudes of the two selectivity values. To this end, the optimizer utilizes comparison operators such as the mathematical operators "<" and ">". With the stated goal of eliminating records as early as possible, a lower selectivity is preferred, since it results in fewer records being considered when the RDBMS applies the remaining predicates. In this case, a selectivity value of 5% indicates that if the predicate is applied, only 5% of the records will remain to be considered (the rest need not be processed further). Accordingly, the first selectivity value would be determined to be superior because 5% is less than 10% and the optimizer would leave the predicates in their current order.

If instead the selectivities were represented as NODs, the optimizer can make this decision more intelligently. Assume that when the estimates for the selectivities are made the information shown in Table III is included.

TABLE III

Selectivity(T1.Col1 = 'A') is 5%, Range = (0%–100%), Confidence = .20, Penalty =10
Selectivity(T2.Col1 = 'B') is 10%, Range = (7%–20%), Confidence = .90, Penalty = 10

In the first predicate shown here, assume that the magnitude, confidence, range and penalty had to be generated by an estimator mechanism within the optimizer that had no real knowledge about the data in the actual table. Based on a programmer's experience and the conditions the predicate was found in, a "guess" of 5% is made. Without additional information, the range for the first predicate must be 0–100% (all inclusive). The confidence in this case is low since the range is all inclusive.

In the second predicate, the optimizer had statistical data available about the actual table, and those measurements are transferred directly to the selectivity NOD for this predicate. In this case, the confidence has relevance, since the range is much smaller as compared to range of the first predicate. The penalty is the same in both cases, because each predicate has the same potential effect on the overall query execution time. In this case, the penalty might represent a multiplier for the effect on the overall cost.

In this context it is apparent that the magnitudes alone provide limited effectiveness in query optimization. Since the range of possible values in which the confidence applies is much larger for the first predicate, a higher potential exists for this predicate's selectivity to be noticeably worse than is suggested by the current estimate's magnitude alone.

Using a more sophisticated comparison operation allowed by the NOD representation of values, the optimizer is provided with additional processing flexibility. Thus, in a particular embodiment, the optimizer may utilize an operator that causes the second predicate to be moved in front of the first. In one embodiment, such a NOD operator might take the form of an abstract operation referred to as "IsBetterThan", which subjectively compares two numeric values in NOD form. In addition, all or some portion of the NOD elements (e.g., magnitude, range, confidence, penalty, etc.) may be accounted for in the comparison. Thus, the particular assessments made by this operator can be configured for a particular implementation. In this way, all/any interesting dimensions of the NOD vector can thus be collectively accounted for.

In one embodiment, the optimizer considers the magnitude and the range of two values. In the present example (Table II), the selectivity magnitudes only differ by a small amount (i.e., 5%) and the range difference is great, thus making the resulting plan more predictable (i.e., run closer to estimates). Specifically, the first predicate's range of possible values is the entire spectrum 0–100%. Thus, when the query is run against real data in the file, it may run, for example, at 3%, 12% or even 100%. Thus, the optimizer's prediction (estimate) of the run time has considerable potential for being extremely wrong. In the case of the second predicate, it is known with near certainty that the range of possible selectivities is between 7 and 20%. Thus, the optimizer cannot be wrong by more than that amount. (In these cases, predictability is equated with how close real run time is to the estimate provided by the optimizer).

Search Space

Another type of decision that the optimizer must make is to determine how much of the universe of possible plans (i.e., the solution space) to "search" by estimating and comparing plan costs. Included in this process are the decision that an acceptable solution has been found (i.e., when to terminate the search), and in what order to canvass the search space. Since the problem of Database Query Optimization in general cannot be solved in finite time, the optimizer must be configured with subjective exit criteria.

In the embodiments provided herein, numeric entities are represented NODs, wherein the dimensions of such a vector can be used to determine when to terminate the search and that a particular area of the search space is not producing interesting plans, and should be abandoned. In the case of terminating the search, the optimizer may quit if, for example, a current plan has a reasonable estimated cost with high confidence. Alternatively or additionally, the optimizer may quit if the plans being developed and estimated do not differ much with respect to their cost/confidence. The latter situation suggests that further optimization is not being achieved and that it is inefficient and ineffective to continue. A determination that a particular area of the search space should be abandoned may be made on the basis of the differences in various vector dimensions between the cost NODs resulting from plans being generated.

An example of "search space" is in the determination of the order in which to process files in a JOIN. If the optimizer is faced with joining 2 or 3 files, it can try all combinations of join order, estimating and comparing costs for each with relative speed. When the number of files grows, the number of combinations grows factorially, and it quickly becomes impossible to try all combinations.

Consider a 6-file JOIN. The optimizer would have to generate and estimate plans for 6! combinations: (1,2,3,4,5, 6) (1,2,3,4,6,5) (1,2,3,6,4,5) (1,2,6,3,4,5) (1,6,2,3,4,5) (6,1, 2,3,4,5), etc. The optimizer must eliminate "families" of these combinations intelligently in order to finish in reasonable time with an acceptable answer. If the optimizer has high confidence that the cost of any plan starting with (1,2,3...) is significantly higher than say, those starting with (4,5,6,...) it may only examine those combinations starting with 4,5,6, thereby eliminating part of the "search space".

In another embodiment, the cumulative effects of mathematically combining estimates or other numeric measurements is considered. Consider the following SQL query:

| QUERY 2 | |
|---|---|
| 0001 | SELECT T1.Col1, T2.Col2 |
| 0002 | FROM T1, T2 |
| 0003 | WHERE |
| 0004 | T1.Col1 = T2.Col3 AND |
| 0005 | T1.Col1 = 'A' AND |
| 0006 | T1.Col3 = 'B' AND |
| 0007 | T1.Col4 = 'C' |

For simplicity, assume that an optimizer is configured to determine which pair of non-JOIN predicates is the most selective. A non-JOIN predicate is any predicate that refers to only one table (e.g. T1.COl1='A'). In contrast, the join predicate in the above query would be "T1.Col1=T2.Col3".

Further assume that statistics are available for Col1 and Col3, but not for Col4. The selectivity values are used are shown in Table IV:

TABLE IV

P1 (T1.Col1 = 'A') Selectivity is 25%
P2 (T1.Col3 = 'B') Selectivity is 50%
P3 (T1.Col4 = 'C') Selectivity defaults to 10% (a common default value)

The selectivity for P3 is set to a default value because of a lack of information, which has the effect of wider range of values and lower or meaningless confidence.

Using well-known combinatorial rules, the selectivity value for each unique pairing is derived and shown in Table V:

TABLE V

Selectivity of (P1 AND P2) = 25% × 50% = 12.5%
Selectivity of (P1 AND P3) = 25% × 10% = 2.5%
Selectivity of (P2 AND P3) = 50% × 10% = 5%

For the values shown in Table V, the optimizer necessarily determines that the second combination (P1 AND P3) is superior (because 2.5% is the lowest selectivity value). However, in the present example, the selectivity values for pairs including P3 contain potential error because the optimizer has no information about the selectivity of P3. In addition, this potential source of error is not accounted for in the result.

In contrast, comparative selectivity values for P1, P2 and P3 represented as NODs are shown in TABLE VI.

TABLE VI

Selectivity(P1) is 25%, Range = (20%–30%), Confidence = .95, Penalty = 10
Selectivity(P2) is 50%, Range = (7%–12%), Confidence = .95, Penalty = 10
Selectivity(P3) is 10%, Range = (0–100%), Confidence = 0, Penalty = 10

In this form, combining the values is both more complex and therefore more meaningful, because the optimizer is provided with more information. In one embodiment, the optimizer may multiply the magnitudes and combine the ranges. In another embodiment, the optimizer may additionally or alternatively add the penalties, since the combined potential penalty is probably more than that of either component. One example of how the NODs of Table V are used is shown by TABLE VII.

TABLE VII

Selectivity of (P1 AND P2) = 25% × 50% = 12.5%, Range 10%–15%, Confidence = .95, Penalty = 20
Selectivity of (P1 AND P3) = 25% × 10% = 2.5%, Range 0%–25%, Confidence = .5, Penalty = 20
Selectivity of (P2 AND P3) = 50% × 10% = 5%, Range 0%–50%, Confidence = .5, Penalty = 20

As mentioned above, some data contained in TABLE VII was arrived at via actual statistical analysis of the values in the file, and others were estimated. In this case, the optimizer may select the first pairing (P1 AND P2) because its range and confidence make it more predictable, even though it may not be the "absolute best" in some cases. That is, under certain conditions another plan may be better, but in this case the user and thus the optimizer are more interested in a query run time that is close to the estimate. Regardless of the particular optimizer configuration, the quality of an optimization decision is greatly improved over conventional optimization techniques, thereby allowing the decisions to be more consistent.

Figure 3:
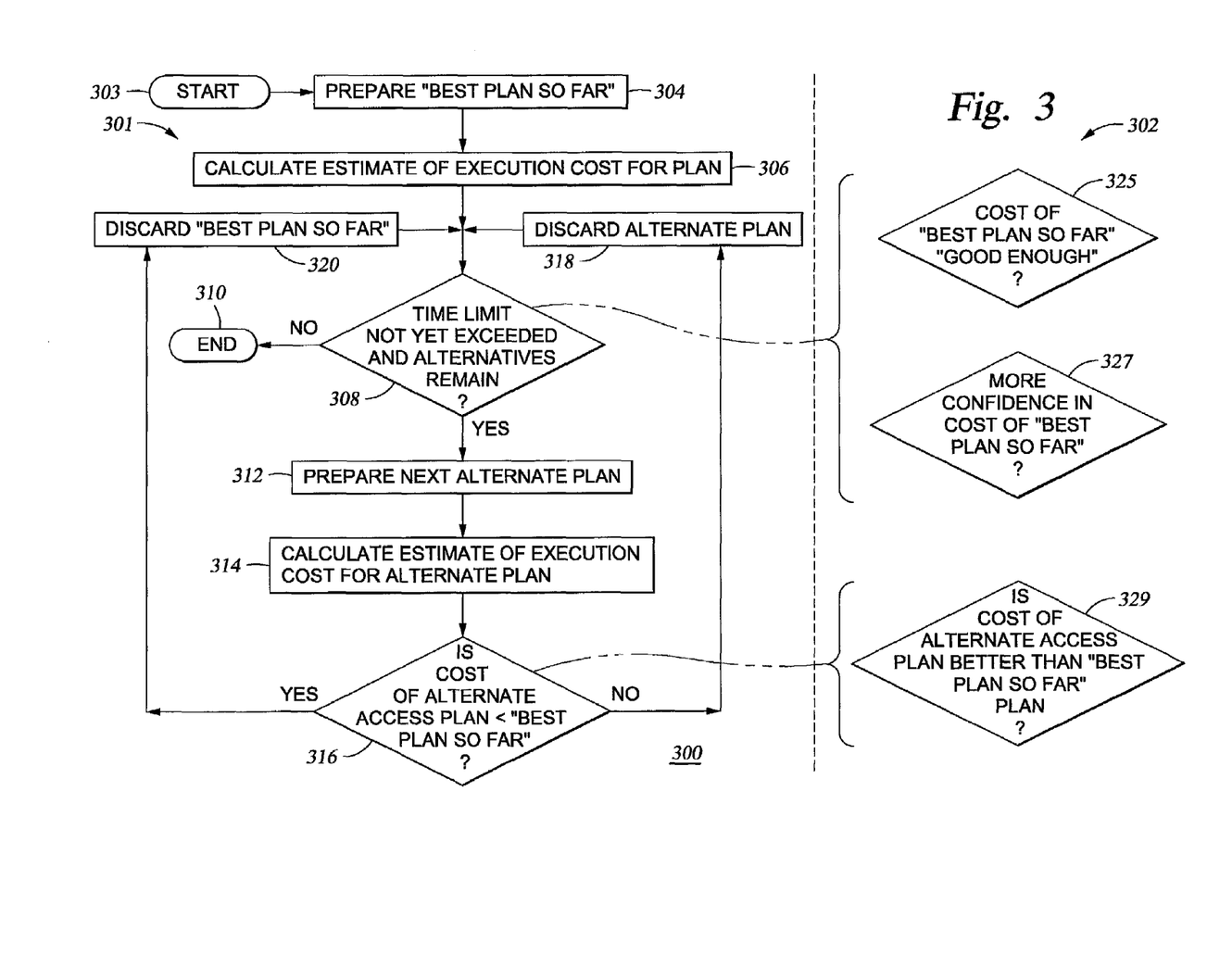
FIG. 3 shows a flow chart illustrating a method of optimizing using a numeric optimizer datum.

FIG. 3 shows a method 300 illustrating a search algorithm of an optimizer. For purposes of comparison, a left-hand portion 301 represents a conventional optimization process, while a right-hand portion 302 represents NOD-based qualitative logic as described in the preceding sections. It is understood that the method 300 is merely illustrative and other NOD-based logic may be provided in other embodiments.

Method 300 is entered at step 303 and proceeds to step 304 where a first possible access plan is prepared. The first possible access plan is set to a value referred to as "the best plan so far" or BPSF. At step 306, an estimated execution cost for the BPSF is calculated. Illustratively, the cost is calculated using vector quantities (NODs) such as selectivity, data page fault I/O cost estimates, index page fault I/O cost estimates, CPU runtime cost of each operation on the data, etc. Thus, the cost is calculated using NODs and is itself a NOD. At step 308, the method 300 queries whether a time limit has been exceeded and whether alternative plans remain. If either the time limit has been exceeded (regardless of whether alternative plans remain) or if no alternative plans remain (regardless of whether the time limit has been exceeded), the method 300 exits at step 310. In this case, the plan prepared at step 304 is selected for execution.

If, however, the time limit has not been exceeded and if alternative plans remain, the method 300 proceeds to step 312 where an alternative plan is prepared. At step 314, the estimated execution cost of the alternative plan is calculated. At step 316, and the execution cost for the BPSF (prepared at step 304) and the execution cost for the alternative plan (prepared step 312) are compared. If the cost of the BPSF is less than the cost of the alternative access plan, the method 300 proceeds to step 318 where the alternative access plan is discarded. The method 300 then returns to step 308 and repeats the foregoing logic.

If the cost of the alternative access plan is less than the cost of the BPSF, then the method 300 proceeds to step 320 and discards the BPSF. The alternate plan is now set to the BPSF and the method 300 then returns to step 308 and repeats the logic described above. Accordingly, the method 300 either exits or compares the cost of the alternative plan currently being processed (now the BPSF) to additional alternative plans.

Embodiments using an NOD are now described with reference to the right hand portion 302 of FIG. 3. In one embodiment, a NOD is implemented at step 308 to facilitate a decision of when to end the optimization process. Illustrative implementations are represented as steps 325 and 327. The step 325 and 327 may be performed independently in lieu of step 308 or, alternatively, may be performed in some combination with one another and/or with step 308.

In one embodiment, the logic at step 308 may be configured to query whether the BPSF is "Good Enough". This qualitative determination, represented as step 325, can be made by a combination of the components of an NOD. For example, if the query is estimated to run in very little time (e.g., a fraction of a second), the user may configure the optimizer for a quick solution. In this case, the optimizer may quit if a small estimate with high confidence is generated.

Accordingly, step 325 represents a determination of how much time the optimizer has been given to provide an execution plan. In a highly dynamic, short running query environment, the optimizer might be configured to bias itself toward a "quick" answer. In another embodiment, a plan may be "good enough", even though alternatives remain, if the estimated time is less than some very small number, say 0.5 seconds.

In another embodiment (represented as step 327), the logic at step 308 is configured to query whether more confidence in the BPSF is desired. If so, steps may be taken to increase the confidence. For example, steps may be taken to suggest (via system messages) to the user that statistics gathered on a column or columns of a table or tables would improve the optimizer's result.

It still another embodiment, a NOD is implemented at step 316 to determine the superiority of one plan over another. As illustrated by step 329, the NOD may be configured to query whether the BPSF "IsBetterThan" an alternative plan. Illustratively, the "IsBetterThan" operator is configured to determine that the plan having the highest confidence is best because it enhances the optimizer's predictability. However, dimensions of the NOD other than confidence may be used to make a decision at step 329.

As used herein, "IsBetterThan" refers to the comparison of two NODs for superiority. In various embodiments, it may apply to runtime cost estimates, estimated record counts (e.g. Fanout), selectivities, etc. The meaning of IsBetterThan is context-specific, and must take into account the "personality" of the evaluator (typically a component of the optimizer). In the cases of selectivity, fanout, and record count, if the optimizer is most interested in fastest possible execution, regardless of predictability of the estimate, smaller magnitude is better, smaller range is better (but not as important), and larger confidence is better. If the optimizer is most interested in providing the user with a predictable answer, the variance range is given more weight in a comparison than the magnitude of the value. Confidence would increase in importance as well (but neither so much as to completely disregard a large difference in magnitude).

As used herein, "GoodEnough" is limited to decisions about when to quit or when to limit iteration through part of the search space. It may also indicated that the resulting estimate is low enough to satisfy a demand for speed, has a variance range that is low enough to satisfy a demand for predictability, or confidence high enough to satisfy a need for finding the best possible value.

The operators "IsBetterThan" and "GoodEnough" are merely illustrative operators. Persons skilled in the art will recognize other operators which may be used to advantage and are within the scope of the present invention.

Tracing the Source of an Estimate

In another embodiment, a result is improved by determining a source of an erroneous or bad estimate. As described above, query optimizers rely on statistical data about the actual values in the columns of a query's tables (or correlation between values in different columns) in order to make estimates of runtime access cost (and in turn to make good decisions about implementation based on those costs). Bad access plans are most often generated because those decisions have to be made regardless of the presence or quality of the statistical data. In addition, without a formal method of representing the error introduced by this bad (or missing) data and the intermediate operations performed on it, there is no way to find out what to do to improve the result.

Thus, an embodiment is provided for determining a source of low quality (e.g., low confidence or a wide variance range) in an estimate. For example, beginning with a resulting estimate that has low confidence or a wide variance interval, steps are taken to navigate back through the various constituent numeric measurements used to calculate this low quality estimate. In this manner, possible sources of the low quality are identified. The optimizer can then use this information to determine a set or sets of columns over which a specific statistics collection might be profitable. Once gathered and calculated, such statistics can be used to modify either the magnitude, variance interval or confidence of the original estimate. This has the cumulative effect of improving the final estimate's quality.

As is well known, optimizers typically leave a "trail" or a history of what calculations and estimates were made on the way to reaching a particular conclusion (plan). This aspect of optimizers is used to advantage by configuring an optimizer to maintain such a history that includes the entirety of an optimization scheme. That is, the final NOD calculation and the intermediate NOD estimates are represented in the history.

In a particular embodiment, each intermediate estimate and NOD-based calculation is included to form an unbroken tree or graph that begins with a final cost estimate in the form of a NOD. The "branches" of the tree include all intermediate calculations (NODs), with each branch terminating with some fundamental measurement. Illustrative fundamental measurements include the selectivity of a predicate or the number of records in a table.

With such a NOD-based history available, the original source (or sources) of a bad estimate can be located by tracing a path(s) of the NOD history tree. At each branch point, the NOD form of each intermediate result can be compared with the NODs for its constituent parts. Where the history is stored with the access plan that it is associated with on the system, a separate tool can be used to invoke this tracing process. Such a tool can traverse the stored plans and show the user a list of queries along with their estimated run times (costs) in NOD form. The user can use this information to tell the tool which ones need to be processed in the manner described above. Once the process has identified one or more fundamental measurements as possible roots of problem estimates, action can be taken.

In one embodiment, a possible action includes automatically triggering a statistics collection(s). The tool can automatically trigger statistics collection(s) that it determines will improve the variance range or confidence associated with that fundamental measurement. In another embodiment, a possible action includes generating a list of offending measurements. The list of offending measurements (including the names of the tables and columns involved) can then be shown to a user, and the user can tell the tool specifically which columns or tables should have statistics gathered on them. In any case, once the desired statistics are gathered, the measurement's value is recalculated in light of the new knowledge. The new value may then be compared with the original value using any or all NOD components of the two values.

In one embodiment, the new value is propagated back through the tree (i.e., the intermediate and final calculations are redone), resulting in an updated estimate for the overall plan. Any or all dimensions of the NOD representation of the measurement or its derived intermediate results will be modified as the tree is updated. Ultimately, the overall estimated cost will most likely contain a more predictable NOD value (higher confidence and/or smaller variance interval) due to "live" statistics (i.e., statistics currently within the database) now in use.

In another embodiment, the new estimate may have a substantially worse magnitude than the previous estimate. In that case, the user or the tool may delete the plan and invoke the optimizer to build a new plan. Equipped with superior data, the optimizer has the potential to make a better choice.

Optimizer Bias

An optimizer must be designed to handle all queries. Sometimes conflicts arise where a conventional optimizer is unable to minimize the run time of one particular form of query without causing others to suffer, usually due to incomplete or estimated information. When an optimizer resolves such inherent conflicts it must take into account not only how much better a particular query will run, but also the risk of slowing down other queries, often trading one for the other. An optimizer's tendency to lean toward one or the other in such cases usually depends on the designer/coder. Such built-in "personality" is referred to herein as the optimizer's "bias".

Some optimizers allow specific adjustments to this "bias" by providing an optimization "level" parameter which does nothing more than prevent the optimizer from considering certain access methods which are at high risk for generating a catastrophic plan. This does not affect their internal tendency toward safety (avoiding disastrous plans), speed (selecting the best plan for a particular case), or whatever else their designers may have been concerned with.

Accordingly, one embodiment of a vector, referred to herein as a "bias vector", simultaneously represents the adjustable aspects of the personality of an optimizer, which will be applied to each and every weighted decision that an optimizer must make. The term "weighted decision" implies that an optimizer is configured to put more emphasis on one aspect or another, such as whether to lean towards predictability, speed of optimization, and the like.

In one embodiment, the possible dimensions on the bias vector are safety, speed and confidence. Safety refers to what degree the optimizer is configured to avoid "bad" plans. Speed refers to how aggressively the optimizer is configured to look for particularly "good" plans. Confidence refers to how predictable the estimated cost of the resulting should plan be.

It should be noted that these dimensions are in opposition to one another such that the weighting for decision making is determined by the ratio between the dimensions. That is, the dimensions of the bias vector cannot all be set to a highest setting. Thus, the optimizer cannot be configured to simultaneously avoid all bad plans, be very fast, and produce the most aggressive plans. As such, an adjustment to one dimension necessarily affects other dimensions. Further, the foregoing dimension are merely illustrative and persons skilled in the art will recognize other dimensions of a bias vector.

At every decision point during an optimization process, the dimensions of a bias vector are combined mathematically with the dimensions of a NOD to determine which way the optimizer will "lean" under different conditions. In this manner, the bias vector configures the optimizer for how much weight to give each dimension from the NODs involved in any decision.

While the foregoing is directed to the preferred embodiments of the present invention, other and further embodiments of the invention may be devised without departing from the basic scope thereof, and the scope thereof is determined by the claims that follow.

What is claimed is:

1. A method of optimizing and processing a query in a database management system in order to retrieve data from computer storage, the method comprising:
receiving a query;
preparing a first execution plan for the query;
calculating a cost for the first execution plan, wherein the cost is represented as a first vector quantity comprising at least two dimensions, wherein at least one dimension is selected from a magnitude, a variance range, a confidence and a penalty; wherein the magnitude is a value having the highest probability to be within the variance range, wherein the variance range is a range in which the confidence applies, wherein the confidence is a probability that a real value is within the variance range, and wherein the penalty is a maximum delta from the magnitude; and
determining whether the first execution plan should be selected for execution based on the first vector quantity.

2. The method of claim 1, wherein determining whether the first execution plan should be selected for execution comprises comparing at least two of the at least two dimensions.

3. The method of claim 1, wherein if the first execution plan is not selected for execution, further comprising:
preparing a second execution plan;
calculating a cost for the second execution plan, wherein the cost for the second execution plan is represented as a second vector quantity; and
selecting one of the first and second execution plans based on the first and second vector quantities.

4. The method of claim 3, further comprising determining whether a selected execution plan meets predetermined acceptance criteria based on the vector quantity of the selected execution plan, wherein if the selected execution plan meets the predetermined acceptance criteria the selected execution plan is executed.

5. The method of claim 3, further comprising determining whether more confidence is desired for a selected execution plan.

6. A method of optimizing and processing a query in a database management system in order to retrieve data from computer storage, the method comprising:
receiving a query;
preparing a first execution plan for the query;
calculating a cost for the first execution plan, wherein the cost is represented as a first vector quantity comprising at least two dimensions, wherein the at least two dimensions comprise at least one of a magnitude, a variance range, a confidence, a penalty and a combination thereof; wherein the magnitude is a value having a highest probability to be within the variance range, wherein the variance range is a range in which the confidence applies, wherein the confidence is a probability that a real value is within the variance range, and wherein the penalty is a maximum delta from the magnitude; and determining whether the first execution plan should be selected for execution based on the first vector quantity.

7. The method of claim 1, wherein determining whether the first execution plan should be selected for execution comprises comparing two or more of the at least two dimensions.

8. The method of claim 1, wherein calculating the cost comprises utilizing at least a second vector quantity comprising at least two dimensions.

9. The method of claim 8, wherein the at least two dimensions of the first vector quantity and the second vector quantity comprise at least one of a magnitude, a variance range, a confidence and a penalty.

10. The method of claim 1, wherein if the first execution plan is not selected for execution, further comprising:
   preparing a second execution plan;
   calculating a cost for the second execution plan; wherein the cost for the second execution plan is represented as a second vector quantity comprising at least two dimensions; and
   selecting one of the execution plans based on the first and second vector quantities.

11. The method of claim 10, further comprising determining whether a selected execution plan meets acceptance criteria based on the vector quantity of the selected execution plan, wherein if the selected execution plan meets the acceptance criteria the selected execution plan is executed.

12. A method of optimizing and processing a query in a database management system in order to retrieve data from computer storage, the method comprising:
   receiving a query;
   preparing a first execution plan for the query;
   calculating a cost for the first execution plan, wherein the cost is represented as a first vector quantity comprising at least two dimensions;
   preparing second execution plan;
   calculating a cost for the second execution plan; wherein the cost for the second execution plan is represented as a second vector quantity comprising at least two dimensions, wherein one of the at least two dimensions of the first and second vector quantities comprises a confidence value;
   selecting one of the execution plans based on the first and second vector quantities; and
   determining whether a higher confidence value is desired for a selected execution plan and, if so, pursuing a strategy to increase the confidence value.

13. A method of optimizing and processing a query in a database management system in order to retrieve data from computer storage, the method comprising:
   receiving a query;
   calculating a first vector quantity of X dimensions, wherein X is an integer greater than 1;
   calculating a second vector quantity of Y dimensions, wherein Y is an integer greater than 1;
   calculating a cost for a first execution plan using the first vector quantity and the second vector quantity; wherein the cost is represented as a third vector quantity comprising N dimensions, wherein N is an integer greater than 1; and
   determining whether the first execution plan should be selected for execution based on the third vector quantity; wherein the X dimensions, Y dimensions and N dimensions comprise at least one of a magnitude, a variance range, a confidence and a penalty; wherein the magnitude is a value having a highest probability to be within the variance range, wherein the variance range is a range in which the confidence applies, wherein the confidence is a probability that a real value is within the variance range, and wherein the penalty is a maximum delta from the magnitude.

14. The method of claim 13, wherein at least one of the first vector quantity and the second vector quantity is selectivity.

15. The method of claim 13, wherein determining whether the first execution plan should be selected for execution comprises comparing each of the N dimensions.

16. A method of optimizing and processing a query in a database management system in order to retrieve data from computer storage, the method comprising:
   receiving a query;
   calculating a first vector quantity of X dimensions, wherein X is an integer greater than 1;
   calculating a second vector quantity of Y dimensions, wherein Y is an integer greater than 1; and
   calculating a cost for a first execution plan using the first vector quantity and the second vector quantity; wherein the X dimensions, Y dimensions, N dimensions and M dimensions comprise at least one of a magnitude, a variance range, a confidence and a penalty; wherein the magnitude is a value having a highest probability to be within the variance range, wherein the variance range is a range in which the confidence applies, wherein the confidence is a probability that a real value is within the variance range, and wherein the penalty is a maximum delta from the magnitude; and
   determining whether the first execution plan should be selected for execution based on the third vector quantity; wherein if the first execution plan is not selected for execution, further comprising:
   preparing a second execution plan;
   calculating a cost for the second execution plan; wherein the second execution plan is represented as a fourth vector quantity comprising M dimensions, wherein M is an integer greater than 1; and
   selecting one of the execution plans based on the third and fourth vector quantities.

* * * * *